US008745408B2

(12) United States Patent
Mangard (10) Patent No.: US 8,745,408 B2
(45) Date of Patent: Jun. 3, 2014

(54) INSTRUCTION ENCRYPTION/DECRYPTION ARRANGEMENT AND METHOD WITH ITERATIVE ENCRYPTION/DECRYPTION KEY UPDATE

(75) Inventor: Stefan Mangard, Munich (DE)

(73) Assignee: Infineon Technologies AG, Neubiberg (DE)

(*) Notice: Subject to any disclaimer, the term of this patent is extended or adjusted under 35 U.S.C. 154(b) by 214 days.

(21) Appl. No.: 13/083,007

(22) Filed: Apr. 8, 2011

(65) Prior Publication Data
US 2012/0260107 A1   Oct. 11, 2012

(51) Int. Cl.
*G06F 21/22*   (2006.01)
(52) U.S. Cl.
USPC ............... 713/190; 713/193; 713/194; 713/2
(58) Field of Classification Search
USPC ........................................................... 713/190
See application file for complete search history.

(56) References Cited

U.S. PATENT DOCUMENTS

| 5,675,645 | A  | * | 10/1997 | Schwartz et al. | 713/187 |
| 6,061,449 | A  | * | 5/2000  | Candelore et al. | 380/28 |
| 6,986,052 | B1 | * | 1/2006  | Mittal | 713/190 |
| 7,673,155 | B2 | * | 3/2010  | Hashimoto et al. | 713/194 |
| 8,341,426 | B2 | * | 12/2012 | Onno et al. | 713/190 |
| 8,347,072 | B2 | * | 1/2013  | Mittal | 713/2 |
| 8,473,150 | B2 | * | 6/2013  | Martin et al. | 701/36 |
| 2003/0046563 | A1 | * | 3/2003  | Ma et al. | 713/190 |
| 2004/0181772 | A1 | * | 9/2004  | Pensak et al. | 717/100 |
| 2006/0015749 | A1 | * | 1/2006  | Mittal | 713/190 |
| 2007/0150755 | A1 | * | 6/2007  | Makii et al. | 713/193 |
| 2009/0006864 | A1 | * | 1/2009  | Hashimoto et al. | 713/190 |
| 2011/0022854 | A1 | * | 1/2011  | Macchetti et al. | 713/190 |

FOREIGN PATENT DOCUMENTS

EP   1361508 A1   11/2003

OTHER PUBLICATIONS

"Tamper-Resistance for Software Protection", submitted in 2005 as a thesis for a degree of Master of Science, Ping Wang.*
Hu, Wei, et al., "Secure and Practical Defense Against Code-injection Attacks using Software Dynamic Translation", VEE '06, Jun. 10-13, 2006, Ottawa, Canada.

* cited by examiner

*Primary Examiner* — Kambiz Zand
*Assistant Examiner* — Yonas Bayou
(74) *Attorney, Agent, or Firm* — Murphy, Bilak & Homiller, PLLC (57) ABSTRACT

An instruction decryption arrangement includes an input interface configured to receive an encrypted instruction, a decryption key updater configured to output a decryption key, and an instruction decrypter including a first input connected to the input interface and a second input connected to the decryption key updater, and configured to decrypt the encrypted instruction using the decryption key and to provide a decrypted instruction. The decryption key updater is further configured to update the decryption key using at least one of the encrypted instruction and the decrypted instruction. An alternative instruction decryption arrangement includes a key stream module configured to iteratively determine a key state corresponding to a current instruction for a computing unit and an instruction decrypter configured to receive an encrypted instruction related to the current instruction and decrypt the encrypted instruction using the key state to provide a decrypted instruction.

30 Claims, 8 Drawing Sheets

INSTRUCTION ENCRYPTION/DECRYPTION ARRANGEMENT AND METHOD WITH ITERATIVE ENCRYPTION/DECRYPTION KEY UPDATE

TECHNICAL FIELD

The instant application relates to an instruction decryption arrangement, more particularly an instruction decryption arrangement in connection with a computing unit that receives encrypted instructions from a memory.

BACKGROUND

With the widespread use of data processing systems affecting major aspects of an individual's personal life, as well as corporate and governmental entities, there exists an inherent risk of abuse of confidential information. Large efforts have been made in the field of information security to improve the confidentiality, integrity, and availability of information. The field of information security relates to the protection of information and information systems from unauthorized access, inspection, disclosure, recording, use, perusal, modification, disruption or destruction.

A programmable computing unit is typically designed to process a sequence of instructions to perform a certain task. The sequence of instructions may also be referred to as program code. The program code is typically stored in a memory and provided to the computing unit at runtime. With a view to information security, it may be desired to protect the instructions from being analyzed while they are stored in the memory or transmitted from the memory to the computing unit. On the other hand, errors may occur during an execution of the program code if the instructions reaching the computing unit differ from desired instructions. Differences between the instruction actually processed by the computing unit and the desired instructions may have a random cause or could be deliberately provoked by an intruder. In any event, errors caused by altered instructions should be detected early.

SUMMARY

Embodiments described herein provide an instruction decryption arrangement that comprises an input interface, a decryption key updater, and an instruction decrypter. The input interface is configured to receive an encrypted instruction. The decryption key updater is configured to output a decryption key. The instruction decrypter comprises a first input connected to the input interface and a second input connected to the decryption key updater. The instruction decrypter is configured to decrypt the encrypted instruction using the decryption key and to provide a decrypted instruction. The decryption key updater is configured to update the decryption key using at least one of the encrypted instruction and the decrypted instruction.

Embodiments described herein provide an instruction decryption arrangement that comprises a key stream module and an instruction decrypter. The key stream module is configured to iteratively determine a key state corresponding to a current instruction for a computing unit. The instruction decrypter is configured to receive an encrypted instruction (that is related to the current instruction) and to decrypt the encrypted instruction using the key state to provide a decrypted instruction.

Embodiments described herein provide an instruction decryption arrangement that comprises a means for receiving an encrypted instruction, a means for updating a decryption key, and a means for decrypting the encrypted instruction using the decryption key and for providing a corresponding decrypted instruction. The means for updating the decryption key is configured to update the decryption key using at least one of the encrypted instruction and the decrypted instruction.

Embodiments described herein provide an instruction encryption arrangement that comprises an input interface configured to receive a plain instruction, an encryption key updater configured to output an encryption key, and an instruction encrypter. The instruction encrypter comprises a first input connected to the input interface and a second input connected to the encryption key updater. The instruction encrypter is configured to encrypt the plain instruction using the encryption key and to provide an encrypted instruction. The encryption key updater is also configured to update the encryption key using at least one of the plain instruction and the encrypted instruction.

Embodiments described herein provide a method for decrypting instructions for a computing unit, the method comprising: receiving an encrypted instruction; obtaining a decryption key; combining the decryption key with the encrypted instruction for generating a decrypted instruction; and updating the decryption key by using at least one of the encrypted instruction and the decrypted instruction.

Embodiments described herein provide a method for decrypting instructions for a computing unit, the method comprising: iteratively determining a key state corresponding to a current instruction for a computing unit and decrypting an encrypted instruction related to the current instruction, wherein the key state is used for decrypting the encrypted instruction to provide a decrypted instruction.

Embodiments described herein provide a method for encrypting instructions for a computing unit, the method comprising: receiving a plain instruction; obtaining an encryption key; combining the encryption key with the plain instruction for generating an encrypted instruction; and updating the encryption key by using at least one of the plain instruction and the encrypted instruction.

Embodiments described herein provide a method for encrypting instructions for a computing unit, the method comprising: receiving a plain instruction; obtaining an encryption key; combining the encryption key with the plain instruction for generating an encrypted instruction; and updating the encryption key by using at least one of the plain instruction and the encrypted instruction.

Embodiments described herein provide a computer readable digital storage medium having stored thereon a computer program having a program code for performing, when running on a computer, one of the methods for decrypting instructions for a computing unit described above.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
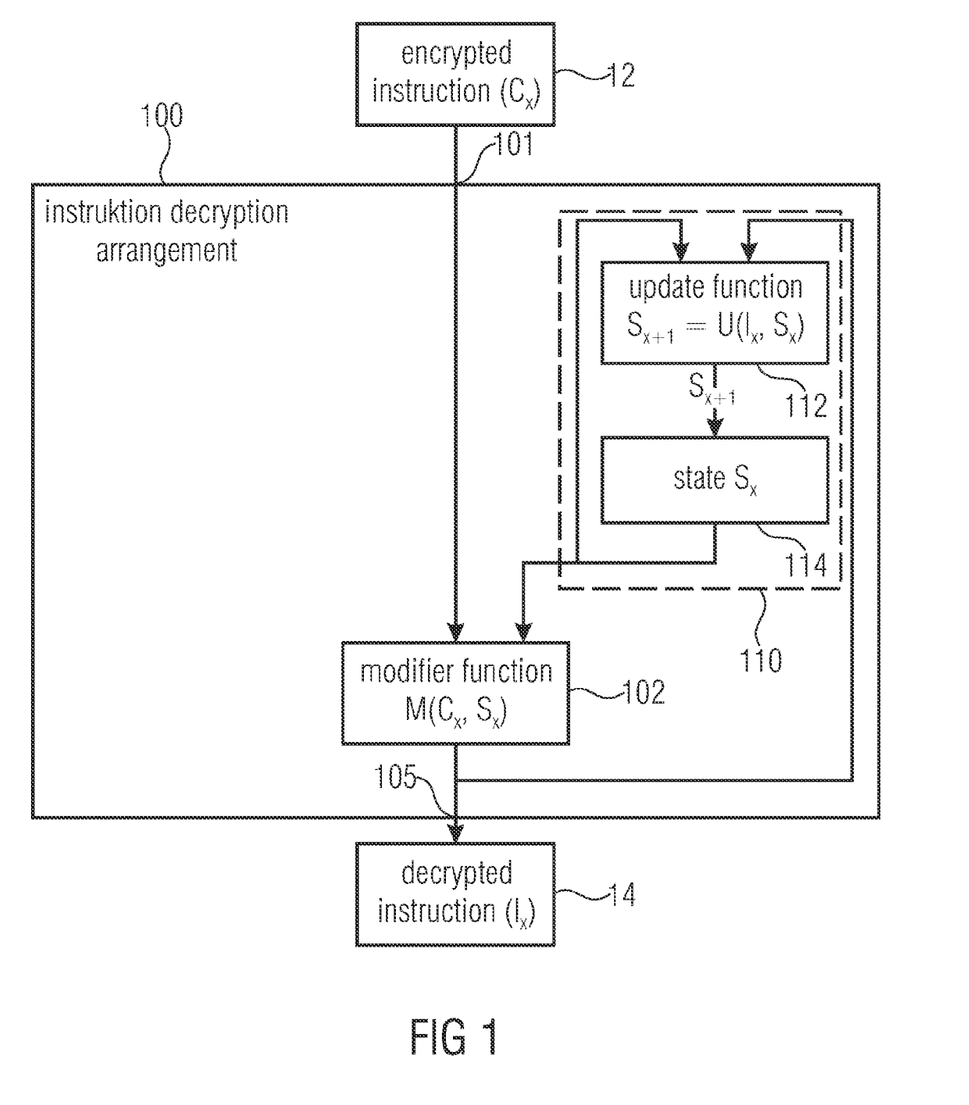
FIG. 1 shows a schematic block diagram of an instruction decryption arrangement in a first possible configuration according to an embodiment.

FIG. 1 shows a schematic block diagram of an instruction decryption arrangement 100 according to a first embodiment. The instruction decryption arrangement 100 is configured to receive encrypted instructions 12 ($C_x$) as input via an input interface 101. The instruction decryption arrangement 100 is further configured to provide decrypted instructions 14 ($I_x$) at an output interface 105. The actual decryption is performed by an instruction decrypter 102 which is labeled "Modifier Function $M(C_x, S_x)$" in FIG. 1, where $S_x$ denotes a decryption key 114. The instruction decrypter 102 receives the encrypted instruction 12 and the decryption key $S_x$ as input. The instruction decrypter 102 combines the decryption key $S_x$ with the encrypted instruction 12 according to a predetermined calculation rule. In one embodiment, the encrypted instruction 12 and the decryption key $S_x$ can be combined using an XOR function. More complex rules for combining the encrypted instruction 12 and the decryption key $S_x$ may also be used.

The decryption key $S_x$ typically is a secret value for internal use of the instruction decryption arrangement 100. Typically, it is not intended that the decryption key $S_x$ becomes known outside the instruction decryption arrangement 100. Attempts to extract the decryption key $S_x$ from the instruction decryption arrangement 100 typically may require considerable efforts, in particular physical attacks on the instruction decryption arrangement 100, such as mechanically opening a housing of the instruction decryption arrangement 100. At some point prior to a transmission of the encrypted instructions 12 to the instruction decryption arrangement 100, the instructions to be decrypted by the instruction decryption arrangement 100 have been encrypted using an encryption key that may be identical to the decryption key $S_x$ (symmetrical encryption) or different from the decryption key $S_x$ (asymmetrical encryption). In particular, the instructions may be stored in memory in the encrypted format so that extracting the encrypted instructions from the memory is typically useless, since the decryption key $S_x$ is typically not known to an intruder.

The instruction decryption arrangement 100 includes a decryption key updater having an iterative decryption key calculator 110 which in turn includes an update function 112 and the decryption key $S_x$, for example stored in a register or a storage element 114. The decryption key $S_x$ may be regarded as a state of the decryption process. According to embodiments described herein, this state $S_x$ is not simply stored but is fed to the instruction decrypter 102 and the modifier function $M(C_x, I_x)$ in order to decrypt the encrypted instruction 12. The result of the modifier function $M(C_x, I_x)$ is also fed to the update function 112 $U(I_x, S_x)$, along with the state $S_x$, i.e. the decryption key. The update function 112 determines a new value for the state $S_{x+1}$ (i.e. the decryption key 114) on the basis of a previous state $S_x$ (previous decryption key) and the decrypted instruction 14 ($I_x$). This determination may be iterative, since the new value for the state $S_{x+1}$ is determined by taking the previous value $S_x$ as a starting point for the determination. In other words, the results of one iteration are used as the starting point for the next iteration. The sequence of key states or decryption keys may be regarded as a key stream.

As an alternative to encrypted/decrypted instructions the instruction decryption arrangement 100 could be configured to process encrypted/decrypted control signals that are assigned to the instructions. In this case, the instruction decryption arrangement 100 could be regarded as a control signal decryption arrangement but its basic structure may be similar. The control signal decryption arrangement would in this case be downstream of an instruction decoder or could indeed be integrated with the instruction decoder.

A program code and its execution can be protected against physical attacks and/or logical attacks. In particular, two aspects are addressed. First, confidentiality of the program code. In the memory and a processor of the computing unit executing the instruction, up to a point within the instruction decoder, the program code is present exclusively in encrypted form. The presence of the program code exclusively in encrypted form in large parts of the computing unit offers strong protection against a large number of passive (observative) attacks, such as power analysis, probing etc. Second, integrity protection of the program execution. During execution, a command or an instruction is decrypted in a correct manner only if up to the occurrence of the instruction no errors have occurred in the control flow. Every error in the control flow (e.g. manipulation of instructions, illegal jumps, . . . ) have immediately after the occurrence of the error the effect that only pseudo-random or encrypted code is being executed. The execution of pseudo-random or encrypted code is then detected by corresponding mechanisms.

Up to now, the aspects of confidentiality and integrity protection have usually been dealt with separately. With respect to the confidentiality of program code, basic mechanisms are memory encryption (e.g. Memory Encryption/Decryption device) and masking. The integrity protection of the program execution is typically implemented by redundancy and sensors. For example, the integrity protection can be provided by modular redundancy in hardware, sensors which guard against mechanisms for implanting errors, coding-related measures in hardware (parities, error detection codes), instruction signatures, redundancy measure in software (e.g. security guidelines to be followed by software developers), etc.

One option for integrity protection is provided by signature verification methods. Signature methods calculate parallel to the execution of program code a signature, which is then checked against reference values at specific points in the code. The signature value at a specific point in the code depends on the instruction at this point and on all instructions prior to this point back to an initialization of the signature. In order to assure that a signature checking is possible and in order to determine the reference values for the verification points, start values, end update values, and update values are inserted in the code in the course of compiling a protected program.

For every point in the program and hence for every instruction there is exactly one defined signature value. In other words, for every instruction of the code it is exactly predetermined which signature value at a time of executing the instruction should be present in the signature register as intermediate result.

A program code often contains branching points which may also be regarded as conditional jumps. After a branching point, the program may be continued along two or more possible branches until a junction point is reached where the two or more branches are merged. The decision on which one of the two or more possible branches the program is continued is made during runtime of the program by evaluating a condition. A signature value calculated during the runtime of the program depends on the branch that has been taken. In order to perform a comparison between the current signature value and a reference signature value valid for this point, the signatures within the two or more branches typically must be aligned to each other. This may be accomplished by setting the signature to a specific value within a branch so that the signature at a junction point when emerging from the branch is equal to the signature at the junction when emerging from another branch. To this end, update instructions are inserted in one or more of the branches. The update instructions can modify the signature by directly overwriting the previous signature value or by adding an update value to the previous signature value.

With respect to the embodiments described herein, the key state has comparable properties to signatures in instruction signature schemes. In particular, it holds that for every instruction of the code it is exactly defined which key state $S_x$ at a time of executing the instruction should be present in the key state. The fact that the right key state is present can for example be ensured by adding corresponding update instructions or by applying other transformations to the code. For the integrity protection of the program execution, the following observation is important:. In case an error occurs in the instruction flow, the state $S_x$ does not correspond to the encrypted instruction fed to the instruction decrypter 102. The reason for the error may be a modification of the opcode or a bad jump. Whatever the reason for the error, in the case of an error in the instruction flow, the encrypted instruction $C_x$ does not correspond to the state $S_x$ anymore. Hence, the modifier function $M(C_x, S_x)$ does not decrypt the encrypted instruction $C_x$ correctly, anymore. Moreover, the instruction fed to the instruction decrypter 102 is also considered for the calculation of the next state $S_{x+1}$ for the next instruction. The consequence is that with the occurrence of an error, the state $S_x$ is corrupted for all subsequent instructions, as well. The link between the encrypted instruction $C_x$ and its corresponding state $S_x$ is durably broken. Starting with the occurrence of a single error in the instruction flow, all subsequent instructions are erroneously decrypted and only pseudo-random instructions will be carried out. Integrity protection is hence provided implicitly. The program is only executed as long as no error has occurred. After an error has occurred, no code of the program is executed any more as it is no longer decrypted correctly.

As mentioned above, after the occurrence of a single error in the instruction flow, all subsequent instructions are erroneously decrypted. The erroneous decryption would also affect instructions that are related to signature verification: Following an error, an instruction for checking a signature value against a reference value would not be decrypted correctly anymore. Indeed, an incorrect decryption typically leads to a significantly different instruction that has nothing to do with checking the signature or even to an invalid instruction. As a consequence, the signature checking instruction would only be correctly executed if no error has occurred. Hence, the result of the signature checking instruction, when it is decrypted correctly and executed, is always "no error", because otherwise the signature checking instruction would not have been executed.

Besides the integrity protection of the program execution, the embodiments described herein also support confidentiality for the executed code. The teachings disclosed herein address the aspects of confidentiality and of integrity protection concurrently.

The degree of protection with respect to confidentiality is substantially determined by the choice of the modifier function $M(C_x, S_x)$. In a simple case the modifier function consists of a simple XOR between the state $S_x$ and the encrypted instruction $C_x$. In this case the initial value of the state $S_x$ represents an n-bit secret.

Figure 2:
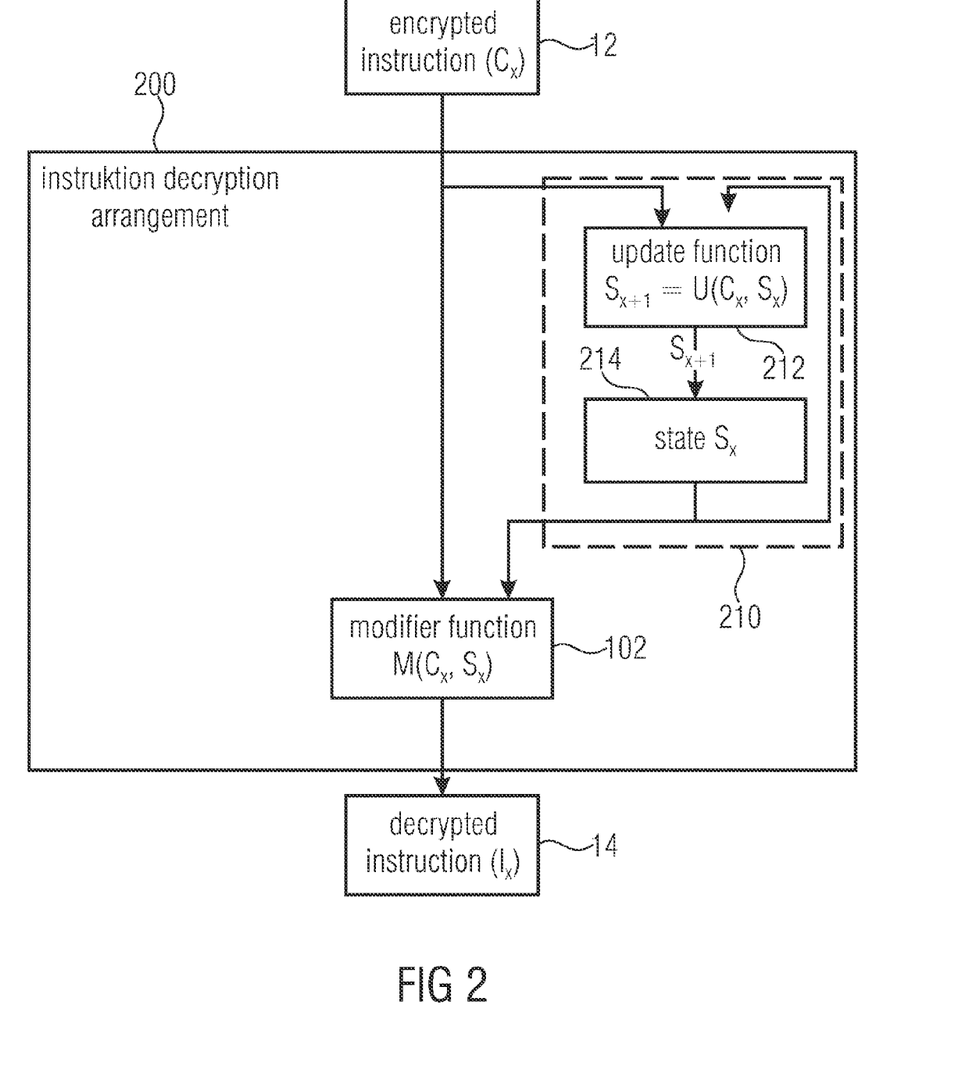
FIG. 2 shows a schematic block diagram of an instruction decryption arrangement in a second possible configuration according to an embodiment.

FIG. 2 shows a schematic block diagram of an instruction decryption arrangement 200 according to a second embodiment. The decryption key updater, and in particular the iterative decryption key calculator 210, includes the update function 212 and the decryption key 214. Departing from the structure shown in FIG. 1, the update function 212 receives the encrypted instruction 12 (CO as one of its inputs, i.e. $S_{x+1}=U(C_x, S_x)$. The other input to the update function 212 is the state $S_x$ (i.e. the decryption key 214), as was the case for the configuration shown in FIG. 1.

To strengthen the integrity protection, a more complex modifier function may be chosen. Furthermore, additional key material may be introduced.

Figure 3:
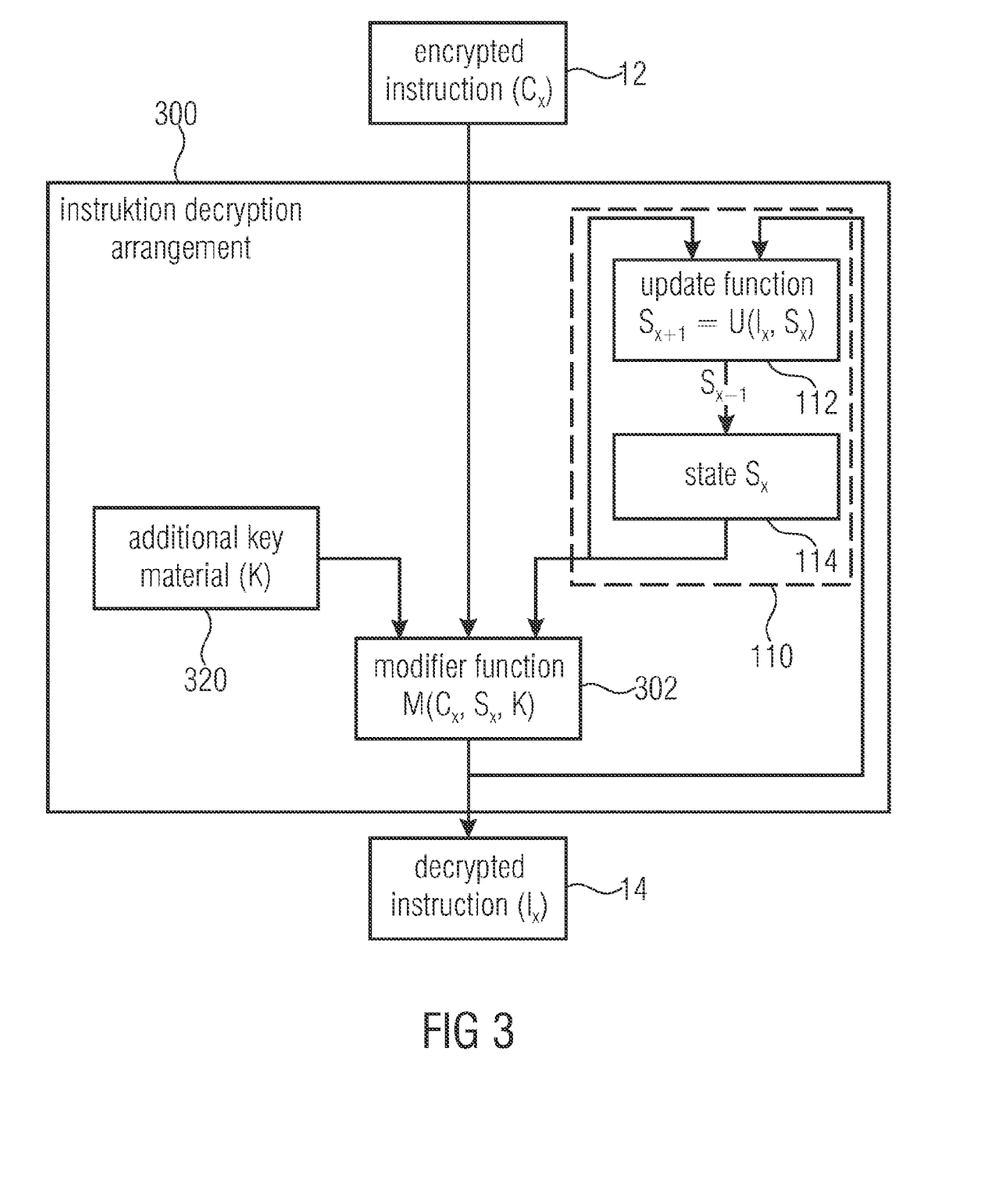
FIG. 3 shows schematic block diagram of an instruction decryption arrangement in a third possible configuration according to an embodiment.

FIG. 3 shows a schematic block diagram of an instruction decryption arrangement 300 according to a third embodiment. The basic structure of instruction decryption arrangement 300 is largely similar to the instruction decryption arrangement 100 shown in FIG. 1. In addition to the functionality of instruction decryption arrangement 100, the modifier function 302 of the instruction decryption arrangement 300 is configured to receive an additional key K from a key storage 320, $M(C_x, S_x, K)$. The decryption of the decrypted instruction 12 ($C_x$) also uses the additional key K. Furthermore, the additional key K also influences the calculation of subsequent decryption keys 114 or states $S_x$, because the update function 112 receives the decrypted instruction 14 ($I_x$) as one of its inputs.

The additional key K may be address-dependent. For example, the additional key K may depend on a storage address of the encrypted instruction.

As an alternative or in addition to being address-dependent, the additional key K may be a static key or a quasi-static key. A quasi-static key may be a key that is, in principle, constant over time, but may be modified or replaced under certain conditions. For example, the quasi-static key could be assigned to a certain user. As another option, the quasi-static key may be assigned to a certain program that is executed by the computing unit. The additional key can be read from a user interface, such as keyboard, so that a user is required to type a personal identification number (PIN) from which the additional key K is derived. Yet another option is to store the additional key on a personal chip card or a similar device.

Figure 4:
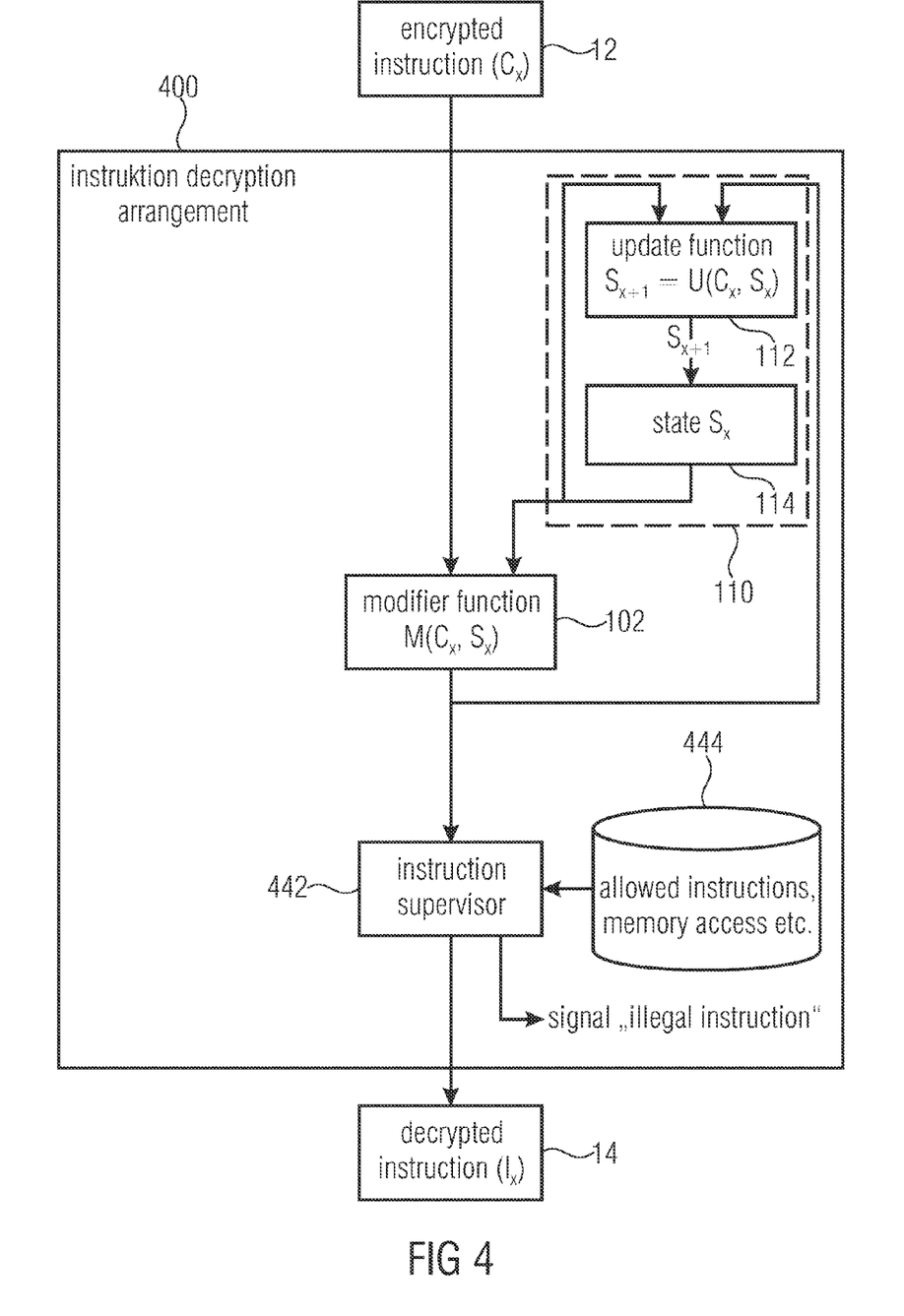
FIG. 4 shows a schematic block diagram of an instruction decryption arrangement in a fourth possible configuration according to an embodiment.

FIG. 4 shows a schematic block diagram of an instruction decryption arrangement 400 according to yet another embodiment. The upper part of the schematic block diagram of the instruction decryption arrangement 400 is identical to the schematic block diagram of the instruction decryption arrangement 100 in FIG. 1. In addition, an instruction supervisor 442 is connected to an output of the instruction decrypter 102. An output of the instruction supervisor 442 provides the decrypted instruction 14 ($I_x$). Typically, the instruction supervisor 442 does not alter the decrypted instruction 14, but checks whether the decrypted instruction 14 is an allowed instruction or an illegal instruction. To this end, the instruction supervisor 442 may retrieve and/or receive information from a database 444, such as a storage element, a memory, or a circuit. The database 444 may contain information about allowable instructions, allowable memory accesses, etc. If, for example the decrypted instruction 14 is characterized by a certain bit pattern, then the instruction supervisor 442 may query the database 444 whether the specific bit pattern exists in the database 444 and whether it corresponds to an allowable instruction or to an illegal instruction. In an analog manner, an allowability of memory access may be verified. The instruction supervisor 442 is configured to generate a signal indicating that an illegal instruction has been detected. In response to the signal generated by the instruction supervisor 442, the execution of a running program may be aborted or modified in order to prevent any major failures.

To detect whether the processor or the computing unit has come to only execute pseudo-random instructions or not, the following mechanisms are possible (non-exhaustive enumeration): detection by means of an occurrence of illegal opcodes; detection by means of an occurrence of illegal memory accesses; and/or "Dead man feature". According to the "dead man feature", rules are defined that the software running on the computing device has to comply with In case the rules are not complied with, an alarm is issued. Examples for rules recurring (periodic and/or in a regular manner) access to a predetermined register, mandatory occurrence of signature update instructions immediately prior or subsequent to a conditional jump, etc.

Figure 5:
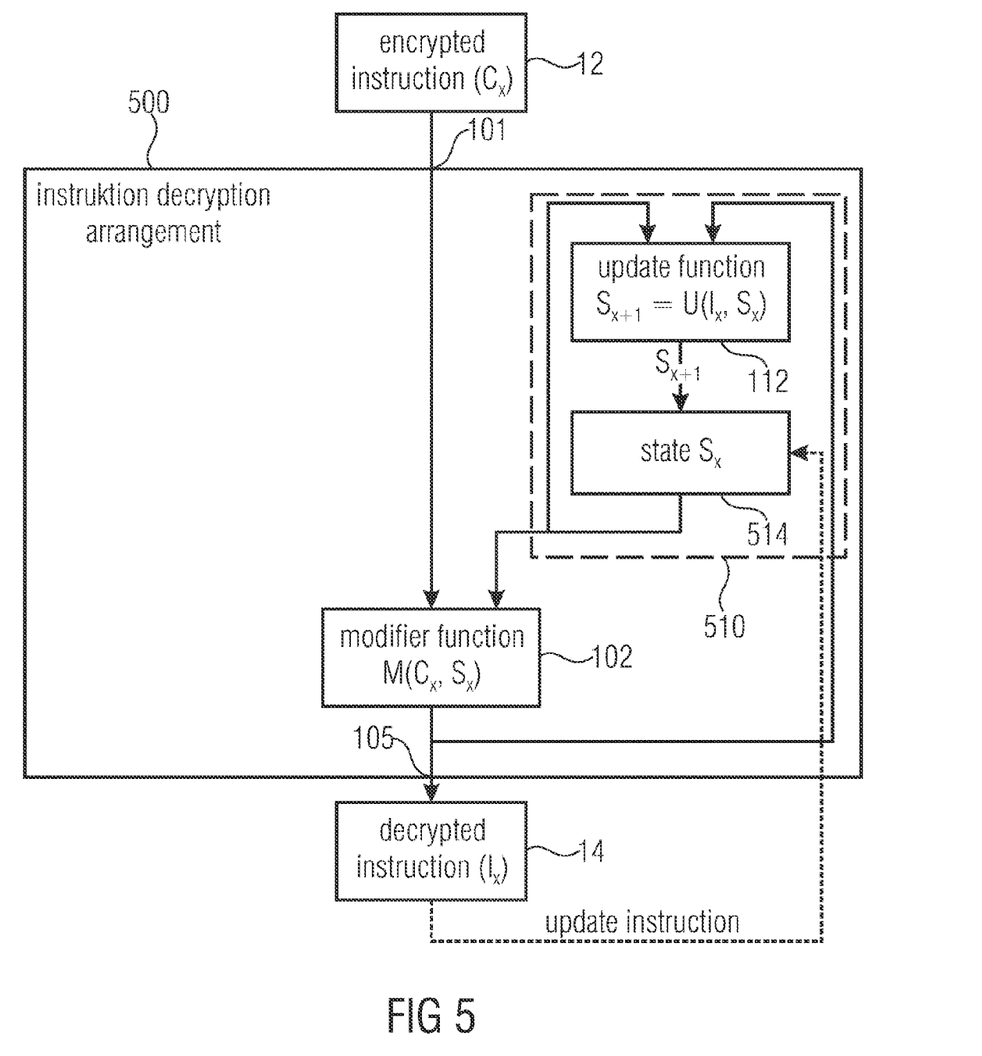
FIG. 5 shows a schematic block diagram of an instruction decryption arrangement in a fifth possible configuration according to an embodiment.

FIG. 5 shows a schematic block diagram of an instruction decryption arrangement 500 according to yet another embodiment which is similar to the configuration shown in FIG. 1. In addition to the elements of the configuration according to FIG. 1, the configuration according to FIG. 5 illustrates that a particular decrypted instruction 14 may be used to explicitly update the key state $S_x$ using an update instruction. Updating the key state register may be required when a conditional jump has occurred so that one branch of at least two possible branches is executed. The at least two possible branches extend from a branch point to a junction point within a program flow. Once the junction point is reached it must be made sure that the instruction(s) subsequent to the junction point are decrypted correctly, regardless of which branch was used to reach the junction point. A correct decryption requires that the key state $S_x$ (decryption key) stored in the key state register corresponds to the encrypted instruction. Therefore, the key state typically needs to be updated in at least one branch so that upon reaching the junction point the key state calculated within the one branch equals the key state calculated within the other branch.

As shown in FIG. 5, the key state register 514 of the decryption key updater, in particular the iterative decryption key calculator 510, includes an input configured to receive an update decryption key value contained in the update instruction. The iterative decryption key calculator 510 is further configured to re-determine the decryption key using the update decryption key value. The re-determination of the decryption key may include an overwriting of a current content of the key state register. Another option for the re-determination is combining the update decryption key value with the current content of the key state register.

Figure 6:
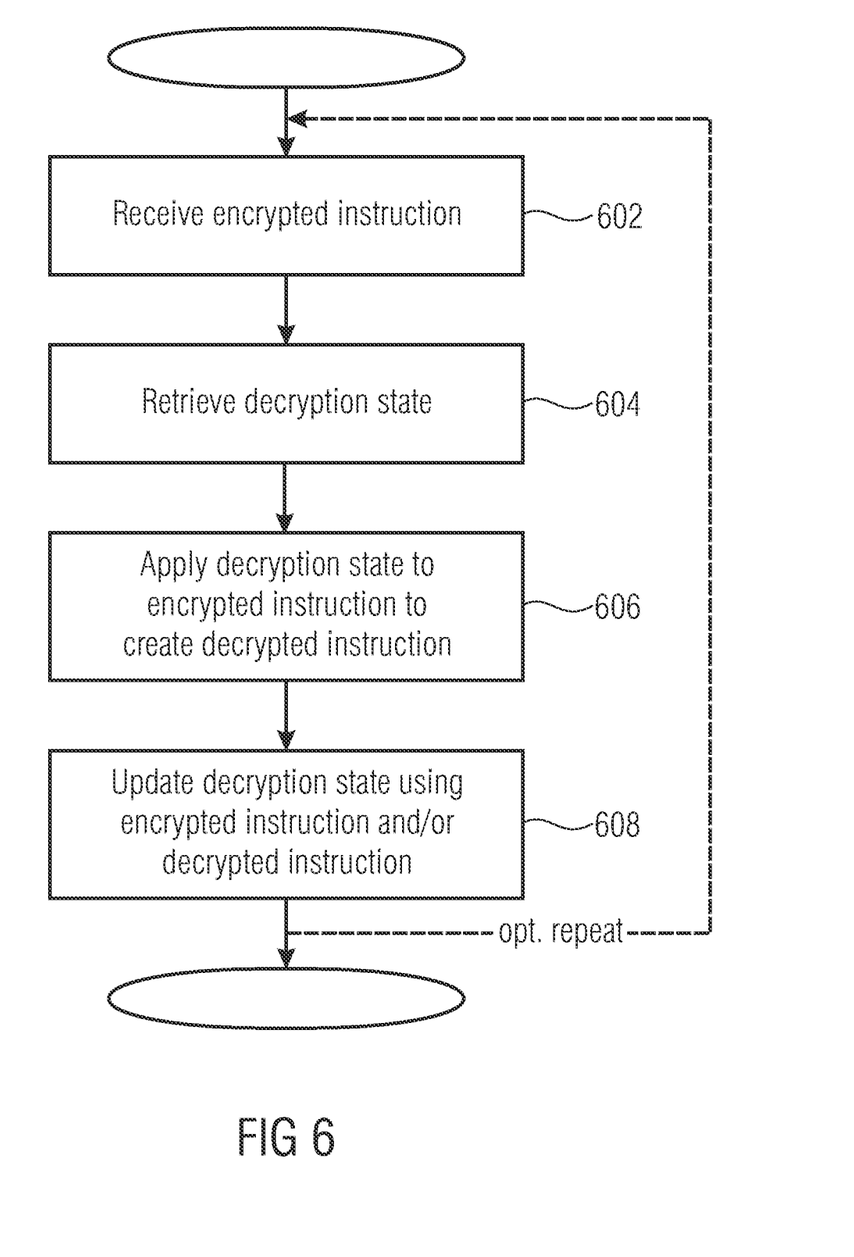
FIG. 6 shows a schematic flow chart of a method for decryption instructions for a computing unit according to a first possible configuration according to an embodiment.

FIG. 6 illustrates a schematic flow diagram of a method for decrypting instructions for a computing unit according to an embodiment. An encrypted instruction is received at block 602. A decryption state (i.e. decryption key) is also retrieved and/or obtained at block 604. In order to decrypt the encrypted instruction, the decryption key is applied to the encrypted instruction at block 606. In particular, the decryption key is combined with the encrypted instruction for generating the decrypted instruction. The combining may be based on a logical combining. At block 608, the decryption key or state is updated using at least one of the encrypted instruction and the decrypted instruction. The method may then be repeated for the next encrypted instruction.

The decryption state $S_x$ (i.e. decryption key 114, 224) may be initialized before the first instruction is decrypted. The initialization may be simply a predetermined value, such as "0", or the initialization may be a secret value stored in the decryption arrangement 100, 200, 300, 400, 500 or provided to the decryption arrangement from an external entity.

Figure 7:
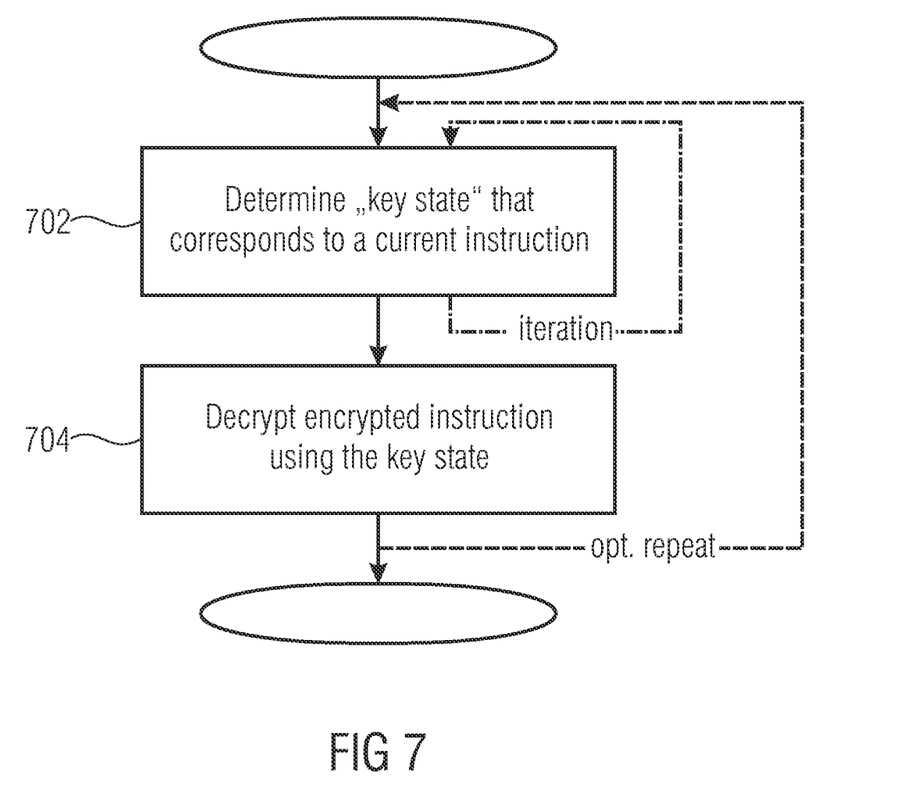
FIG. 7 shows a schematic flow chart of a method for decryption instructions for a computing unit according to a second possible configuration according to an embodiment.

FIG. 7 shows a schematic flow diagram of another method for decrypting instructions for a computing unit according to an embodiment. At block 702, a key state is determined that corresponds to a current instruction. As indicated by the looping arrow labeled "iteration", this determination is typically performed iteratively, i.e. the result(s) of one iteration is/are used as the starting point for the next iteration. In particular, the key state for the current instruction is calculated by using the key state for the previous instruction as a starting point and then the previous key state is combined (e.g. added, multiplied, divided, etc.) with a value derived from the current instruction. At block 704, the key state is used to decrypt the encrypted instruction 12 ($C_x$). The method may then loop back to block 702 in order to perform another repetition for a subsequent instruction.

Figure 8:
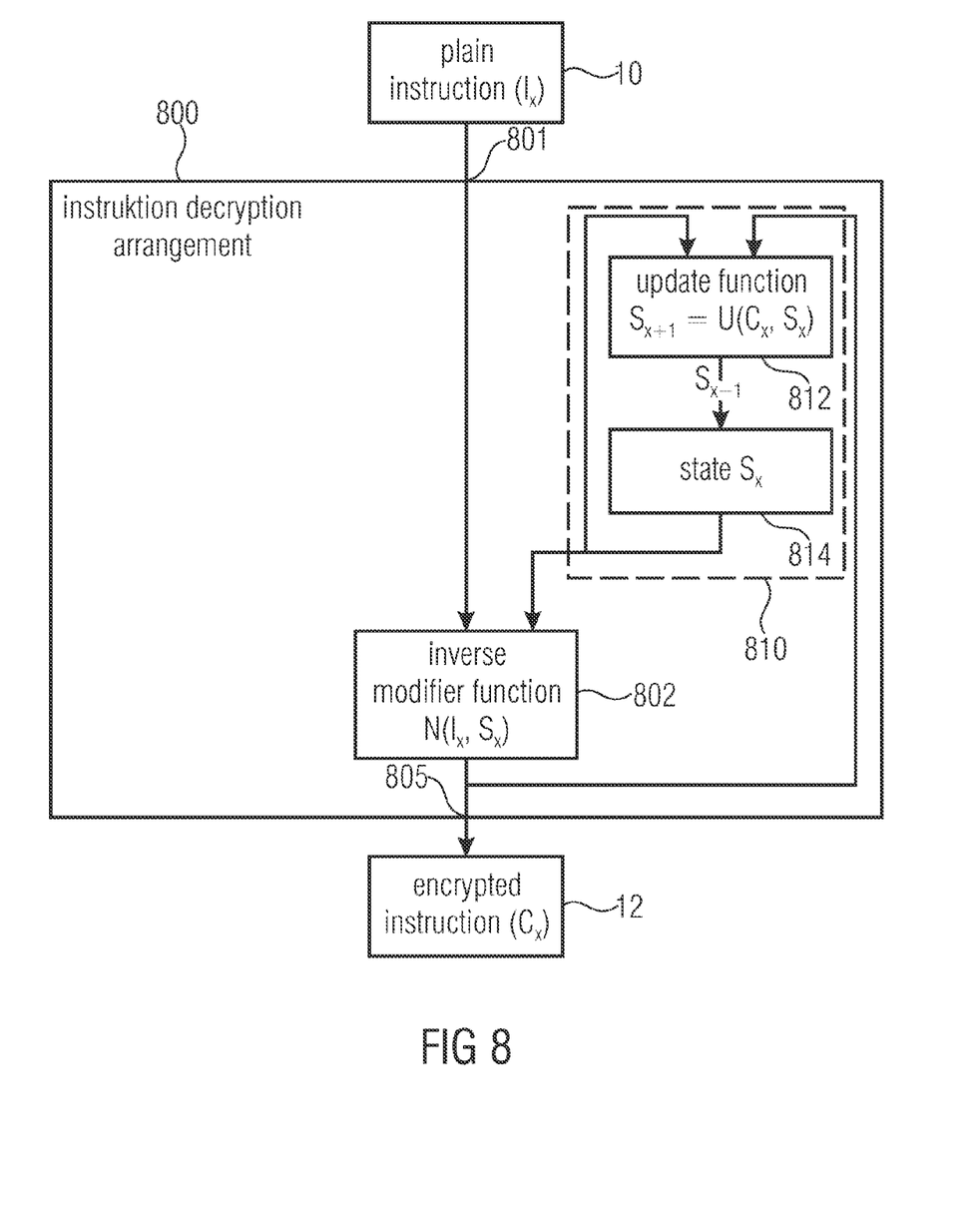
FIG. 8 shows a schematic block diagram of an instruction encryption arrangement according to an embodiment.

FIG. 8 shows a schematic block diagram of an instruction encryption arrangement 800 according to an embodiment. The instruction encryption arrangement 800 is configured to receive a plain instruction 10 ($I_x$) at an input interface 801. The instruction encryption arrangement 800 is further configured to provide an encrypted instruction 12 ($C_x$) at an output interface 805. The actual encryption is performed by an instruction encrypter 802 which is labelled "Inverse Modifier Function $N(I_x, S_x)$" in FIG. 8 because it may be understood as the inverse function to the modifier function $M(C_x, S_x)$ 102 shown in FIG. 1 (or similar modifier functions in the configurations shown in FIGS. 2 to 5). In the context of FIG. 8, $S_x$ denominates an encryption key or key state. The instruction encrypter 802 receives the plain instruction 10 and the encryption key $S_x$ as input. The instruction encrypter 802 combines the encryption key $S_x$ with the plain instruction 10 according to a predetermined calculation rule. For example, the plain instruction 10 and the encryption key $S_x$ could be combined using an XOR function. More complex rules for combining the plain instruction 10 and the encryption key $S_x$ may also be used.

The instruction encryption arrangement 800 also includes an encryption key updater having an iterative encryption key calculator 810 which in turn includes an update function 812 and the encryption key $S_x$, for example stored in a register or a storage element 814. The encryption key $S_x$ may be regarded as a state of the encryption process. According to embodiments described herein, this state $S_x$ is not simply stored but also fed to the instruction encrypter 802 and the inverse modifier function $N(I_x, S_x)$ in order to encrypt the plain instruction 10. The result of the inverse modifier function $N(I_x, S_x)$ is also fed to the update function 812 $U(C_x, S_x)$, along with the state $S_x$, i.e. the decryption key. The update function 812 determines a new value for the state $S_{x+1}$ (i.e. the encryption key 114) based on a previous state $S_x$ (previous encryption key) and the encrypted instruction 12 ($I_x$). This determination may be iterative, since the new value for the state $S_{x+1}$ is determined by taking the previous value $S_x$ as a starting point for the determination. In other words, the results of one iteration are used as the starting point for the next iteration. The sequence of key states or encryption keys may be regarded as a key stream.

As an alternative to plain/encrypted instructions the instruction encryption arrangement 800 could be configured to process plain/encrypted control signals that are assigned to the instructions. In this case, the instruction encryption arrangement 800 could be regarded as a control signal encryption arrangement but its basic structure may be similar. The control signal encryption arrangement would in this case be downstream of an instruction encoder or could indeed be integrated with the instruction encoder.

The instruction encryption arrangement 800 may be modified and/or extended in a similar manner as the instruction decryption arrangement 100 shown in FIG. 1. In particular, the instruction encryption arrangement 800 may further include one or more of the features shown and discussed in connection with FIGS. 2 to 5, possibly after being adapted to the use within an instruction encryption arrangement 800.

A method for encrypting plain instructions according to the embodiments described herein substantially functions in an analogous manner as the instruction encryption arrangement 800. Reference is also made to the explanation of the functionality of the method for decrypting instructions that is provided above in the context of the FIGS. 6 and 7. The method for encrypting plain instructions may be extended by similar or analogous features as the method for decrypting, the instruction decryption arrangement, and/or the instruction encryption arrangement.

The method for encrypting plain instructions may be implemented in the form of a computer program or a software. The computer program may be used in the context of producing binary code or machine-language code from a source code, such as a software development kit (SDK) or a programming environment. Some of the typical components that are used for producing binary code or machine-language code are: a compiler, a linker, a post-processing tool, and a debugger. The method for encrypting plain instructions may be implemented within one or more of these components so that an encrypted binary code or an encrypted machine-language code is produced.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware and/or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention include a data carrier having electronically readable control signals, which are capable of cooperating with a programmable computer system, such that one or more of the methods described herein is performed.

Generally, embodiments of the present invention can be implemented as a computer program product with a program code, the program code being operative for performing one or more of the methods when the computer program product runs on a computer. The program code may for example be stored on a machine readable carrier.

Other embodiments include the computer program for performing one or more of the methods described herein, stored on a machine readable carrier.

In other words, according to an embodiment, a computer program having a program code for performing one or more of the methods described herein can be provided, when the computer program runs on a computer.

According to a further embodiment, therefore, a data carrier (or a digital storage medium, or a computer-readable medium) has recorded thereon, the computer program for performing one or more of the methods described herein. The data carrier, the digital storage medium or the recorded medium are typically tangible and/or non-transitionary.

A further embodiment includes a processing means, for example a computer, or a programmable logic device, configured to or adapted to perform one or more of the methods described herein.

A further embodiment includes a computer having installed thereon the computer program for performing one or more of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one or more of the methods described herein. Generally, the methods are preferably performed by any hardware apparatus.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An instruction decryption arrangement, comprising:
an input interface configured to receive an encrypted instruction;
a decryption key updater configured to output a decryption key; and
an instruction decrypter comprising a first input connected to the input interface and a second input connected to the decryption key updater, and configured to decrypt the encrypted instruction using the decryption key and an additional decryption key that depends on a storage address of the encrypted instruction, and to provide a decrypted instruction;
wherein the decryption key updater is further configured to update the decryption key using at least one of the encrypted instruction and the decrypted instruction.

2. The instruction decryption arrangement according to claim 1, wherein the decryption key updater comprises an iterative decryption key calculator, an input connected to the output of the instruction decrypter, and a combiner configured to calculate an updated decryption key based on a previous decryption key provided by the iterative decryption key calculator and based on the decrypted instruction.

3. The instruction decryption arrangement according to claim 1, wherein the decryption key updater comprises an iterative decryption key calculator, an input connected to the input interface, and a combiner configured to calculate an updated decryption key based on a previous decryption key provided by the iterative decryption key calculator and based on the encrypted instruction.

4. The instruction decryption arrangement according to claim 1, wherein the additional decryption key is a static key or a quasi-static key.

5. The instruction decryption arrangement according to claim 1, wherein the encrypted instruction comprises an encrypted control signal for a computing unit using the decrypted instruction and wherein the decrypted instruction comprises a decrypted control signal for the computing unit.

6. The instruction decryption arrangement according to claim 1, further comprising an instruction supervisor configured to detect illegal decrypted instructions and to generate a corresponding signal upon detection of an illegal decrypted instruction.

7. The instruction decryption arrangement according to claim 1, further comprising a memory access supervisor configured to detect illegal memory access by a computing unit and to generate a corresponding signal upon detection of an illegal memory access.

8. The instruction decryption arrangement according to claim 1, further comprising a guideline supervisor configured to supervise a conformity with at least one guideline to be fulfilled by an instruction sequence and to generate a corresponding signal upon detection of an infringement of the at least one guideline.

9. The instruction decryption arrangement according to claim 8, wherein the guideline relates to at least one of an access to a specific register of a computing unit, the access obeying a certain schedule or frequency; and an occurrence of mandatory update of a key state before or subsequent to a conditional jump in an instruction sequence.

10. The instruction decryption arrangement according to claim 1, wherein the decryption key updater comprises an input configured to receive an update decryption key value and wherein the decryption key updater is further configured to re-determine the decryption key using the update decryption key value.

11. The instruction decryption arrangement according to claim 10, wherein the decryption key updater further comprises a writable key state register configured to receive the update decryption key via a write instruction to a key state register.

12. An instruction encryption arrangement, comprising:
an input interface configured to receive a plain instruction;
an encryption key updater configured to output an encryption key; and
an instruction encrypter comprising a first input connected to the input interface and a second input connected to the encryption key updater, and configured to encrypt the plain instruction using the encryption key and an additional encryption key, and to provide an encrypted instruction, wherein the additional encryption key depends on a storage address of the encrypted instruction;
wherein the encryption key updater is further configured to update the encryption key using at least one of the plain instruction and the encrypted instruction.

13. The instruction encryption arrangement according to claim 12, wherein the encryption key updater comprises an iterative encryption key calculator, an input connected to the output of the instruction encrypter, and a combiner configured to calculate an updated encryption key based on a previous encryption key provided by the iterative encryption key calculator and based on the encrypted instruction.

14. The instruction encryption arrangement according to claim 12, wherein the encryption key updater comprises an iterative encryption key calculator, an input connected to the input interface, and a combiner configured to calculate an updated encryption key based on a previous encryption key provided by the iterative encryption key calculator and based on the plain instruction.

15. The instruction encryption arrangement according to claim 12, wherein the plain instruction comprises a plain control signal for a computing unit using the decrypted instruction and wherein the encrypted instruction comprises an encrypted control signal for the computing unit.

16. The instruction encryption arrangement according to claim 12, further comprising a guideline implementer configured to implement a conformity with at least one guideline to be fulfilled by an instruction sequence.

17. The instruction encryption arrangement according to claim 16, wherein the guideline relates to at least one of: an access to a specific register of a computing unit, the access obeying a certain schedule or frequency; and an insertion of a mandatory update instruction of a key state before or subsequent to a conditional jump in an instruction sequence.

18. An instruction decryption arrangement, comprising:
a key stream module configured to iteratively determine a key state corresponding to a current instruction for a computing unit; and
an instruction decrypter configured to receive an encrypted instruction and to decrypt the encrypted instruction using the key state and an additional decryption key to provide a decrypted instruction, wherein the additional encryption key depends on a storage address of the encrypted instruction.

19. The instruction decryption arrangement according to claim 18, wherein the key stream module comprises a combiner configured to combine a previous key state and the current instruction to obtain the key state corresponding to the current instruction.

20. The instruction decryption arrangement according to claim 18, further comprising a key storage configured to store an additional decryption key, wherein the key storage is connected to the instruction decrypter and the instruction decrypter is further configured to decrypt the encrypted instruction by also using the additional decryption key.

21. The instruction decryption arrangement according to claim 18, further comprising an instruction supervisor configured to detect illegal decrypted instructions and to generate a corresponding signal upon detection of an illegal decrypted instruction.

22. The instruction decryption arrangement according to claim 18, further comprising a memory access supervisor configured to detect illegal memory access by the computing unit caused by the decrypted instruction and to generate a corresponding signal upon detection of an illegal memory access.

23. The instruction decryption arrangement according to claim 18, further comprising a guideline supervisor configured to supervise a conformity with at least one guideline to be fulfilled by an instruction sequence and to generate a corresponding signal upon detection of an infringement of the at least one guideline.

24. The instruction decryption arrangement according to claim 23, wherein the guideline relates to at least one of: an access to a specific register of the computing unit, the access obeying a certain schedule or frequency; and an occurrence of key state update instructions before or subsequent to a conditional jump in an instruction sequence.

25. An instruction decryption arrangement, comprising:
means for receiving an encrypted instruction;
means for updating a decryption key; and
means for decrypting the encrypted instruction using the decryption key and an additional decryption key, and for providing a corresponding decrypted instruction, wherein the additional encryption key depends on a storage address of the encrypted instruction;
wherein the means for updating the decryption key is configured to update the decryption key using at least one of the encrypted instruction and the decrypted instruction.

26. A method for decrypting instructions for a computing unit, the method comprising:
receiving an encrypted instruction;
obtaining a decryption key;
combining the decryption key and with an additional decryption key with the encrypted instruction for generating a decrypted instruction, wherein the additional encryption key depends on a storage address of the encrypted instruction; and
updating the decryption key by using at least one of the encrypted instruction and the decrypted instruction.

27. A method for decrypting instructions for a computing unit, the method comprising:
iteratively determining a key state corresponding to a current instruction for a computing unit; and
decrypting an encrypted instruction related to the current instruction, wherein the key state and an additional decryption key are used for decrypting the encrypted instruction to provide a decrypted instruction, wherein the additional encryption key depends on a storage address of the encrypted instruction.

28. A non-transitory computer readable digital storage medium having stored thereon a computer program having a program code for performing, when running on a computer, a method for decrypting instructions for a computing unit, the method comprising:
receiving an encrypted instruction;
obtaining a decryption key;
combining the decryption key and an additional decryption key with the encrypted instruction for generating a decrypted instruction, wherein the additional encryption key depends on a storage address of the encrypted instruction; and
updating the decryption key by using at least one of the encrypted instruction and the decrypted instruction.

29. A method for encrypting instructions for a computing unit, the method comprising:
receiving a plain instruction;
obtaining an encryption key;
combining the encryption key and an additional encryption key with the plain instruction for generating an encrypted instruction, wherein the additional decryption key depends on a storage address of the encrypted instruction; and
updating the encryption key by using at least one of the plain instruction and the encrypted instruction.

30. A non-transitory computer readable digital storage medium having stored thereon a computer program having a program code for performing, when running on a computer, a method for encrypting instructions for a computing unit, the method comprising:
receiving a plain instruction;
obtaining an encryption key;
combining the encryption key and an additional encryption key with the plain instruction for generating an encrypted instruction, wherein the additional decryption key depends on a storage address of the encrypted instruction; and
updating the encryption key by using at least one of the plain instruction and the encrypted instruction.

* * * * *